US012626054B2

(12) United States Patent
Singh et al.

(10) Patent No.: US 12,626,054 B2

(45) Date of Patent: May 12, 2026

(54) USER INTERFACE(S) RELATED TO SYNTHESIZING PROGRAMS IN A SPREADSHEET PROGRAMMING LANGUAGE

(71) Applicant: Google LLC, Mountain View, CA (US)

(72) Inventors: Rishabh Singh, San Jose, CA (US); Aaron Zemach, Mountain View, CA (US); Chiraag Galaiya, Mountain View, CA (US); Dima Brezhnev, Mountain View, CA (US); David Lick, Mountain View, CA (US); Francisco Velasquez, Mountain View, CA (US); Max Lin, Mountain View, CA (US); Neha Bhargava, Mountain View, CA (US); Peilun Zhang, Mountain View, CA (US); Rahul Srinivasan, Mountain View, CA (US); Simon Tong, Mountain View, CA (US); Victoria Taylor, Mountain View, CA (US); Vishnu Sivaji, Mountain View, CA (US); Zifan Xiao, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/122,313

(22) Filed: Dec. 15, 2020

(65) Prior Publication Data

US 2021/0383060 A1     Dec. 9, 2021

Related U.S. Application Data

(60) Provisional application No. 63/036,895, filed on Jun. 9, 2020.

(51) Int. Cl.
| | | |
|---|---|---|
| *G06F 40/18* | (2020.01) | |
| *G06F 8/30* | (2018.01) | |
| *G06F 8/33* | (2018.01) | |

(52) U.S. Cl.
CPC ................ *G06F 40/18* (2020.01); *G06F 8/31* (2013.01); *G06F 8/33* (2013.01)

(58) Field of Classification Search
CPC .............. G06F 40/18; G06F 8/31; G06F 8/33
(Continued)

(56) References Cited

U.S. PATENT DOCUMENTS

| | | | |
|---|---|---|---|
| 6,430,584 B1 * | 8/2002 | Comer | .................... G06F 40/18 |
| | | | 715/212 |
| 6,766,512 B1 | 7/2004 | Khosrowshahi et al. | |

(Continued)

FOREIGN PATENT DOCUMENTS

| | | |
|---|---|---|
| JP | H06139261 | 5/1994 |
| JP | H08234975 | 9/1996 |

(Continued)

OTHER PUBLICATIONS

Gulwani, S. et al., "Spreadsheet Data Manipulation Using Examples;" Communications of the ACM, vol. 55, No. 8; pp. 97-105; Aug. 1, 2012.

(Continued)

*Primary Examiner* — Stephen S Hong
*Assistant Examiner* — Tionna M Burke
(74) *Attorney, Agent, or Firm* — Gray Ice Higdon

(57) ABSTRACT

Techniques are described herein for automatically synthesizing programs that include one or more functions in a spreadsheet programming language. A method includes: receiving first user input in a first cell in a spreadsheet; automatically synthesizing a program using the first user input in the first cell as a first example, where the program (Continued)

includes at least one function in a spreadsheet programming language and, when the program is executed, the program generates output that matches the first example; determining at least one additional cell in the spreadsheet that is related to the first cell; determining that a display triggering condition is satisfied; and in response to the determining that the display triggering condition is satisfied, displaying, in each of the at least one additional cell, an output of the program corresponding to the additional cell.

18 Claims, 7 Drawing Sheets

(58) Field of Classification Search
USPC ............................................................ 715/212
See application file for complete search history.

(56) References Cited

U.S. PATENT DOCUMENTS

| | | | |
|---|---|---|---|
| 8,799,234 B2 | 8/2014 | Gulwani et al. | |
| 8,972,930 B2 * | 3/2015 | Gulwani | G06F 8/30 |
| | | | 717/107 |
| 10,409,892 B2 * | 9/2019 | Rothschiller | G06F 40/103 |
| 10,503,822 B1 * | 12/2019 | Spencer | G06F 40/197 |
| 10,635,414 B2 | 4/2020 | Gulwani et al. | |
| 10,831,451 B2 | 11/2020 | Udupa et al. | |
| 11,036,478 B2 | 6/2021 | Lu | |
| 2003/0226105 A1 | 12/2003 | Waldau | |
| 2008/0244508 A1 | 10/2008 | Mantuano | |
| 2009/0328010 A1 | 12/2009 | Cao et al. | |
| 2010/0257116 A1 * | 10/2010 | Mehta | G06Q 10/063 |
| | | | 707/751 |
| 2010/0269092 A1 | 10/2010 | Dorman | |
| 2011/0302553 A1 | 12/2011 | Gulwani | |
| 2012/0011084 A1 * | 1/2012 | Gulwani | G06F 40/16 |
| | | | 706/12 |
| 2013/0125094 A1 | 5/2013 | Wolfram | |
| 2014/0282375 A1 | 9/2014 | Gulwani et al. | |
| 2015/0019216 A1 | 1/2015 | Singh et al. | |
| 2017/0124050 A1 * | 5/2017 | Campbell | G06V 30/412 |
| 2017/0220543 A1 | 8/2017 | Canton | |
| 2018/0052815 A1 | 2/2018 | Hvezda | |
| 2018/0075115 A1 | 3/2018 | Murray et al. | |
| 2018/0113848 A1 | 4/2018 | Gulwani et al. | |
| 2018/0113906 A1 | 4/2018 | Gulwani et al. | |
| 2018/0157468 A1 | 6/2018 | Stachura | |
| 2018/0232351 A1 | 8/2018 | Singh et al. | |
| 2019/0042210 A1 | 2/2019 | Gaunt et al. | |
| 2019/0121847 A1 | 4/2019 | Castaneda-Villagran | |

FOREIGN PATENT DOCUMENTS

| | | |
|---|---|---|
| JP | 2000276535 | 10/2000 |
| JP | 2006172445 | 6/2006 |
| KR | 20180122870 | 11/2018 |
| WO | 2015080734 | 6/2015 |

OTHER PUBLICATIONS

European Patent Office; International Search Report and Written Opinion of Application No. PCT/US2021/036585; 15 pages; dated Sep. 24, 2021.

Gulwani, S. et al.; NLyze: Interactive Programming by Natural Language for SpreadSheet Data Analysis and Manipulation; ACM; 12 pages; dated 2014.

Cunha, J. et al.; Model-based programming environments for spreadsheets; 22 pages; dated 2014.

Intellectual Property India; Examination Report issued in Application No. 202247067560; 5 pages; dated Apr. 8, 2025.

European Patent Office; Communication pursuant to Article 94(3) EPC issued in Application No. 21737521.1; 6 pages; dated Mar. 11, 2025.

Gijutsu Hyoronsha Editorial Department et al., Easy Office 2019 for Immediate Use, First Edition, 14 pages, dated May 28, 2020.

Sakaki, Y., Ilnvincible Rules for Excel: Eliminating Mistakes while Saving Time, First Edition, Impress Corporation, 6 pages, dated May 1, 2020.

* cited by examiner

100

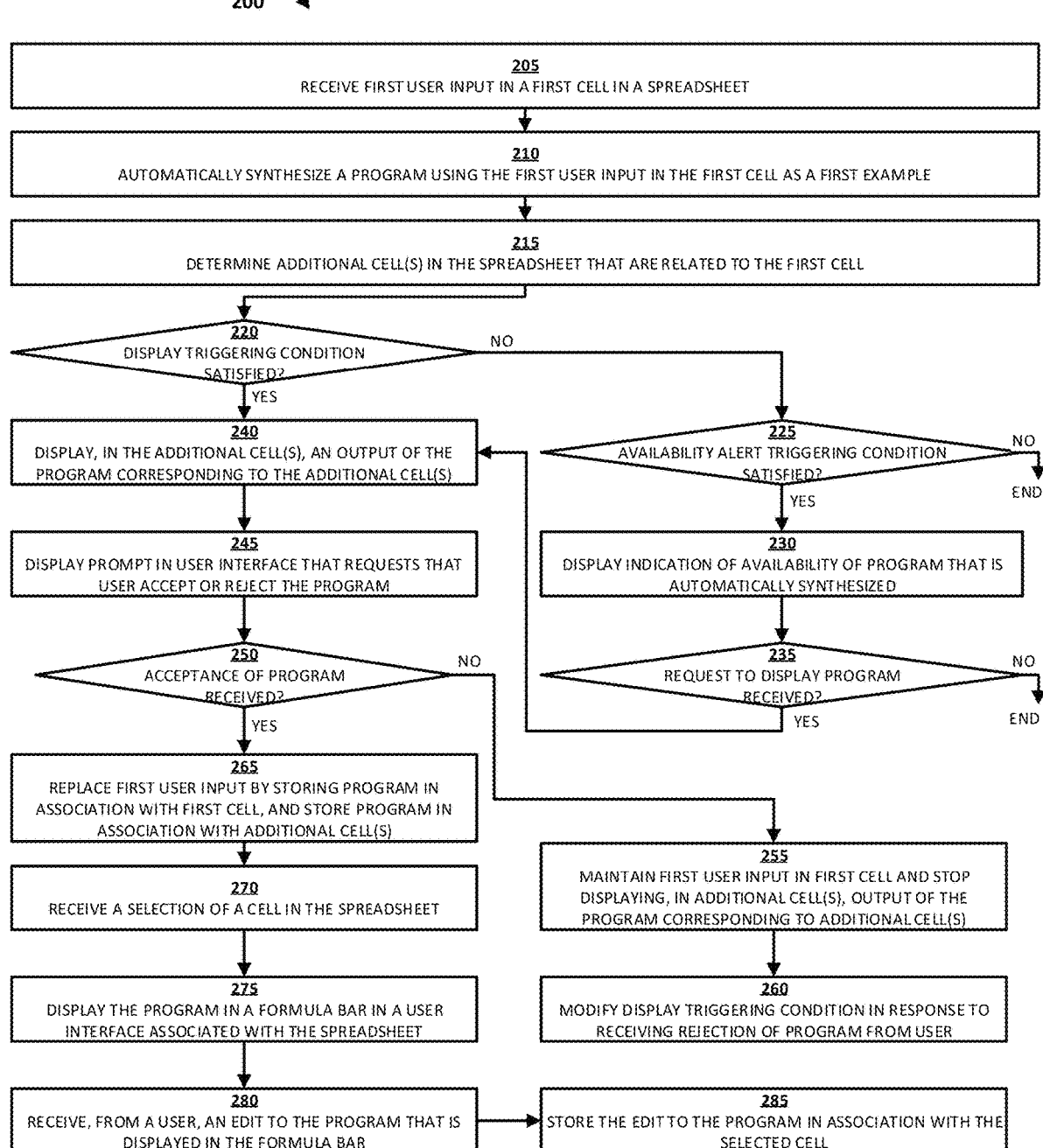

200

205
RECEIVE FIRST USER INPUT IN A FIRST CELL IN A SPREADSHEET

210
AUTOMATICALLY SYNTHESIZE A PROGRAM USING THE FIRST USER INPUT IN THE FIRST CELL AS A FIRST EXAMPLE

215
DETERMINE ADDITIONAL CELL(S) IN THE SPREADSHEET THAT ARE RELATED TO THE FIRST CELL

220
DISPLAY TRIGGERING CONDITION SATISFIED?          NO

YES

240
DISPLAY, IN THE ADDITIONAL CELL(S), AN OUTPUT OF THE PROGRAM CORRESPONDING TO THE ADDITIONAL CELL(S)

225
AVAILABILITY ALERT TRIGGERING CONDITION SATISFIED?          NO
END

YES

245
DISPLAY PROMPT IN USER INTERFACE THAT REQUESTS THAT USER ACCEPT OR REJECT THE PROGRAM

230
DISPLAY INDICATION OF AVAILABILITY OF PROGRAM THAT IS AUTOMATICALLY SYNTHESIZED

250
ACCEPTANCE OF PROGRAM RECEIVED?          NO

YES

235
REQUEST TO DISPLAY PROGRAM RECEIVED?          NO
YES          END

265
REPLACE FIRST USER INPUT BY STORING PROGRAM IN ASSOCIATION WITH FIRST CELL, AND STORE PROGRAM IN ASSOCIATION WITH ADDITIONAL CELL(S)

270
RECEIVE A SELECTION OF A CELL IN THE SPREADSHEET

255
MAINTAIN FIRST USER INPUT IN FIRST CELL AND STOP DISPLAYING, IN ADDITIONAL CELL(S), OUTPUT OF THE PROGRAM CORRESPONDING TO ADDITIONAL CELL(S)

275
DISPLAY THE PROGRAM IN A FORMULA BAR IN A USER INTERFACE ASSOCIATED WITH THE SPREADSHEET

260
MODIFY DISPLAY TRIGGERING CONDITION IN RESPONSE TO RECEIVING REJECTION OF PROGRAM FROM USER

280
RECEIVE, FROM A USER, AN EDIT TO THE PROGRAM THAT IS DISPLAYED IN THE FORMULA BAR

285
STORE THE EDIT TO THE PROGRAM IN ASSOCIATION WITH THE SELECTED CELL

Fig. 2

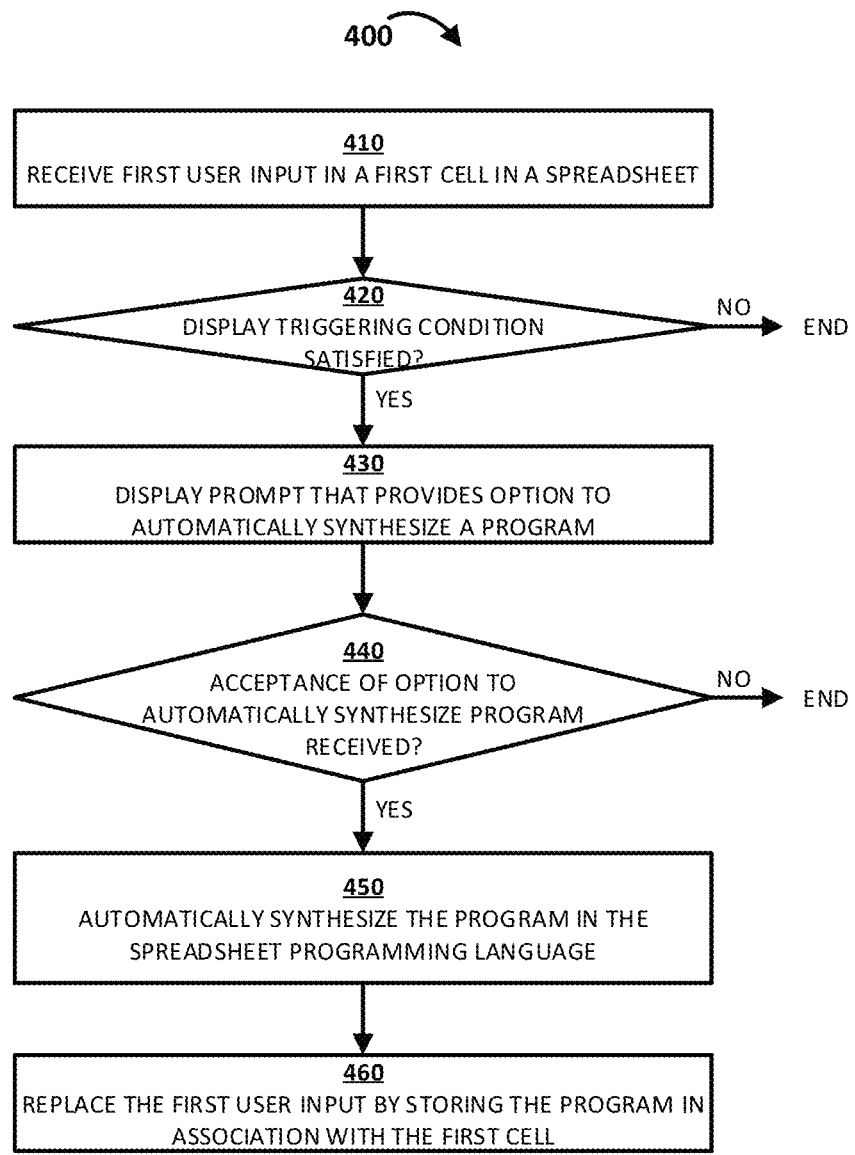

400

410
RECEIVE FIRST USER INPUT IN A FIRST CELL IN A SPREADSHEET

420
DISPLAY TRIGGERING CONDITION SATISFIED?          NO → END

YES

430
DISPLAY PROMPT THAT PROVIDES OPTION TO AUTOMATICALLY SYNTHESIZE A PROGRAM

440
ACCEPTANCE OF OPTION TO AUTOMATICALLY SYNTHESIZE PROGRAM RECEIVED?          NO → END

YES

450
AUTOMATICALLY SYNTHESIZE THE PROGRAM IN THE SPREADSHEET PROGRAMMING LANGUAGE

460
REPLACE THE FIRST USER INPUT BY STORING THE PROGRAM IN ASSOCIATION WITH THE FIRST CELL

Fig. 4

USER INTERFACE(S) RELATED TO SYNTHESIZING PROGRAMS IN A SPREADSHEET PROGRAMMING LANGUAGE

BACKGROUND

Spreadsheet applications may implement a spreadsheet programming language that includes various functions that operate on data in a cell or range of cells in a spreadsheet and/or on other inputs in order to produce various outputs. Non-limiting examples of functions in a spreadsheet programming language include sum, count, average, length, concatenate, maximum, minimum, and lookup functions.

Users may manually enter data into a spreadsheet that could be obtained programmatically. For example, a user may manually enter last names into a column in a first table that could be obtained instead by using a function in a spreadsheet programming language to extract the last names from a column in a second table that stores full names. This manual approach, however, may be an inefficient use of user time and computer storage resources, as it may result in excessive data entry, client device usage, and duplication of the same data in multiple places in a spreadsheet. Additionally, when the underlying data changes in one location (e.g., a user's last name changes), the change must be manually propagated to all places in the spreadsheet where the data is used.

Users who are not programmers or experienced spreadsheet application users may be unaware of or uncomfortable with using functions in the spreadsheet programming language that are usable to programmatically obtain data to populate certain cells in a spreadsheet. Additionally, users may not understand how to combine together multiple functions in the spreadsheet programming language to form a program to obtain data to populate certain cells in a spreadsheet. Other users may be able to write their own programs that use multiple functions in the spreadsheet programming language to obtain data, but the programs that they write may be inefficient solutions that require excess processing and memory resources compared to more efficient solutions for obtaining the same data. Moreover, manually crafting the programs can often take an extended amount of time (e.g., to identify appropriate function(s), for trial and error, etc.) and, as a result, can lead to excess usage of power resources and/or other computational resource(s) of a client device used in manually crafting the programs. This can be exacerbated when the client device has a relatively small display and/or a software keyboard, both of which can prolong the amount of time needed to craft the programs.

SUMMARY

Implementations disclosed herein relate to automatically synthesizing a program that includes at least one function in a spreadsheet programming language and that, when executed, generates output matching one or more user-provided output examples. For example, a first user input in a first cell in a spreadsheet can be used as a first example, and a program can be automatically synthesized such that the program, when executed, generates output that matches the first example. At least one additional cell in the spreadsheet that is related to the first cell can then be identified, and a determination can be made that a display triggering condition is satisfied. In response to the determination that the display triggering condition is satisfied, outputs of the program corresponding to the additional cells can then be displayed in the additional cells.

In some implementations, the determining that the display triggering condition is satisfied can include determining that a level of complexity of the program that is automatically synthesized satisfies a complexity threshold. In an example, the complexity threshold can be a maximum complexity threshold, and programs that do not exceed the maximum complexity threshold, e.g., based on a number of functions or a number of levels of nested functions, can be determined to satisfy the complexity threshold. Accordingly, system resources can be conserved by avoiding using overly complex programs.

In some implementations, a confidence score associated with the program that is automatically synthesized can be determined. The determining that the display triggering condition is satisfied can include determining that the confidence score associated with the program that is automatically synthesized exceeds a predetermined confidence threshold. In an example, the confidence score can be a score that indicates a level of confidence that the program that is automatically synthesized will generate correct output. In another example, the confidence score can be based on compliance of the program with coding rules or coding standards (e.g., rules related to best practices).

In some implementations, in response to the confidence score associated with the program that is automatically synthesized exceeding a minimum confidence threshold but not exceeding the predetermined confidence threshold, an indication of availability of the program that is automatically synthesized can be displayed in a user interface associated with the spreadsheet.

In some implementations, a determination can be made that a synthesizing triggering condition is satisfied. The automatically synthesizing the program can be performed in response to the determination that the synthesizing triggering condition is satisfied. In some implementations, the determination that the synthesizing triggering condition is satisfied can be based on the receiving the first user input in the first cell.

In some implementations, second user input in a second cell in the spreadsheet can be received. The determining that the synthesizing triggering condition is satisfied can be further based on the receiving the second user input in the second cell. The automatically synthesizing the program can further include using the second user input in the second cell as a second example, and the program, when executed, can further generate output that matches the second example.

In some implementations, the program can be displayed in a formula bar in a user interface associated with the spreadsheet. In some implementations, an edit to the program that is displayed in the formula bar can be received from a user, and the edit to the program can be stored in association with the first cell.

In some implementations, the output of the program can be displayed in the additional cells using a font, a style, or a color that is different from the font, the style, or the color used to display the first user input in the first cell.

In some implementations, a prompt can be displayed in a user interface associated with the spreadsheet that requests that a user accept or reject the program, and in response to the displaying the prompt, an acceptance of the program can be received from the user. In response to receiving the acceptance of the program from the user, the first user input can be replaced by storing the program in association with the first cell, and the program can be stored in association with the additional cells. In some implementations, the acceptance of the program can be received in response to a selection of a user interface element that is included in the prompt or in response to an input of a keyboard shortcut.

In some implementations, a first font appearance including a font, a style, and a color can be used to display the user input in the first cell. Prior to the receiving the acceptance of the program from the user, the output of the program can be displayed in the at least one additional cell using a second font appearance that is different from the first font appearance, and subsequent to the receiving the acceptance of the program from the user, the output of the program can be displayed in the first font appearance.

In some implementations, a prompt can be displayed in a user interface associated with the spreadsheet that requests that a user accept or reject the program, and in response to the displaying the prompt, a rejection of the program can be received from the user. In response to the receiving the rejection of the program from the user, the first user input in the first cell can be maintained, and the displaying of the output of the program in the additional cells can be stopped. In some implementations, the display triggering condition can be modified in response to receiving the rejection of the program from the user.

In some additional or alternative implementations, first user input in a first cell in a spreadsheet can be received, the first user input including at least one function in a spreadsheet programming language. A display triggering condition can be determined to be satisfied based on the receiving the first user input in the first cell, and in response to the determining that the display triggering condition is satisfied, a prompt can be displayed in a user interface associated with the spreadsheet that provides an option to automatically synthesize a program in the spreadsheet programming language based on an example, where the program, when executed, generates output that matches the example.

In some implementations, the display triggering condition can be a threshold amount of time spent providing the first user input. In some implementations, the display triggering condition can be a level of complexity of the first user input that exceeds a level of complexity of the program. Accordingly, system resources can be conserved by replacing user-generated programs with programs that may be more efficient (e.g., by using fewer processing resources or memory resources).

In some implementations, in response to the displaying the prompt, an acceptance of the option to automatically synthesize the program can be received. The program in the spreadsheet programming language can be automatically synthesized using a result value in the first cell in the spreadsheet generated based on the first user input as the example, and in response to the receiving the acceptance, the first user input can be replaced by storing the program in association with the first cell.

In some implementations, the acceptance of the option to automatically synthesize the program can be received in response to a selection of a user interface element that is included in the prompt or in response to an input of a keyboard shortcut.

In some additional or alternative implementations, first user input in a first cell in a spreadsheet can be received, and in response to the receiving the first user input in the first cell, a determination can be made that a display triggering condition is not satisfied. Second user input in a second cell in the spreadsheet can be received, and in response to the receiving the second user input in the second cell, a determination can be made that the display triggering condition is satisfied. A program can be automatically synthesized using the first user input in the first cell as a first example and the second user input in the second cell as a second example, where the program comprises at least one function in a spreadsheet programming language and, when the program is executed, the program generates first output that matches the first example and second output that matches the second example. At least one additional cell that is related to the first cell and the second cell can be determined, and in response to the determination that the display triggering condition is satisfied, an output of the program can be displayed in the additional cells.

In some implementations, the output of the program is displayed in the at least one additional cell using a font, a style, or a color that is different from the font, the style, or the color used to display the first user input in the first cell and the second user input in the second cell. In some implementations, the display triggering condition is based on user feedback and previous user interactions with the spreadsheet.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 depicts a flowchart illustrating an example method for practicing selected aspects of the present disclosure.

FIG. 4 depicts another flowchart illustrating an example method for practicing selected aspects of the present disclosure.

DETAILED DESCRIPTION

Figure 1:
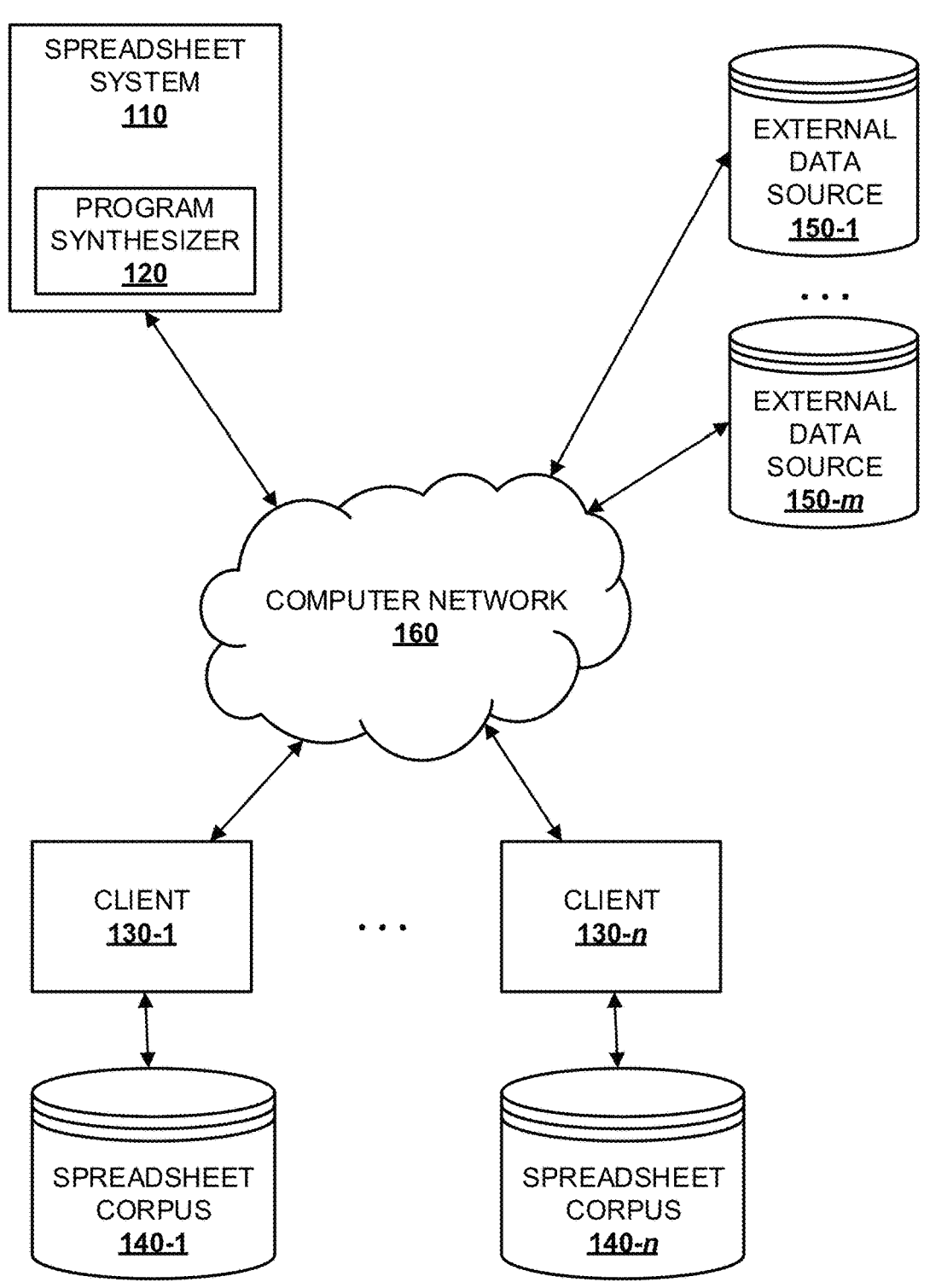
FIG. 1 schematically depicts an example environment in which selected aspects of the present disclosure may be implemented, in accordance with various implementations.

FIG. 1 schematically depicts an example environment 100 in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a spreadsheet system 110, may be implemented using one or more server computing devices that form what is sometimes referred to as a "cloud infrastructure," although this is not required.

In implementations, the environment 100 may include a spreadsheet system 110 that implements a spreadsheet application that is accessible from various clients, including clients 130-1, . . . , 130-n that may be included in the environment 100, through either a thin client interface, such as a web browser (e.g., a web-based spreadsheet application), or a program interface. In implementations, the spreadsheet application that is implemented by the spreadsheet system 110 may be a software as a service (SaaS) spreadsheet application. The spreadsheet system 110 and the clients 130-1, . . . , 130-n may be in communication via a computer network 160, which may be any suitable network including any combination of a local area network (LAN), wide area network (WAN), or the Internet. The spreadsheet system 110 may include, among other things, a program synthesizer 120 that is configured to perform selected aspects of the present disclosure in order to automatically synthesize programs that include one or more functions in a spreadsheet programming language for use in spreadsheets that are created, modified, and/or viewed using one or more of the clients 130-1, . . . , 130-n.

Each of the clients 130-1, . . . , 130-n may be, for example, a user computing device that is used by a user to access a spreadsheet application via spreadsheet application user interface, such as a SaaS spreadsheet application, that is provided by the spreadsheet system 110, e.g., through a web browser. In an example, the clients 130-1, . . . , 130-n may be user computing devices associated with an individual or an entity or organization such as a business (e.g., financial institute, bank, etc.), non-profit, club, university, government agency, or any other organization that uses a spreadsheet application. For example, a business may operate a spreadsheet application to create, modify, and/or view one or more spreadsheets to manage financial records, business records, client lists, and so forth.

In various implementations, the environment 100 may include spreadsheet corpuses 140-1, . . . , 140-n that are accessible to the clients 130-1, . . . , 130-n via the computer network 160 or another network. Each of the spreadsheet corpuses 140-1, . . . , 140-n may include multiple spreadsheets created by one or more of the clients 130-1, . . . , 130-n, e.g., using the spreadsheet system 110. In an example, the spreadsheet corpuses 140-1, . . . , 140-n may include a set of spreadsheets created, edited, or viewed by users of one or more of the clients 130-1, . . . , 130-n associated with a particular entity or organization.

The program synthesizer 120 may be configured to utilize, as examples, data input into one or more cells in a spreadsheet in order to aid the clients 130-1, . . . , 130-n in automatically synthesizing programs that include one or more functions in a spreadsheet programming language for use in the spreadsheet. For example, the program synthesizer 120 may be configured to enable automatic synthesis of programs that include one or more functions in a spreadsheet programming language, without requiring any human intervention, and to optionally present the output of the automatically synthesized programs to users of the clients 130-1, . . . , 130-n via the spreadsheet application user interface as well as optionally present the automatically synthesized programs themselves to users of the clients 130-1, . . . , 130-n for review and/or editing via the spreadsheet application user interface.

In various implementations, the environment 100 may include external data sources 150-1, . . . , 150-m that store data that may be accessible to the clients 130-1, . . . , 130-n and/or the program synthesizer 120 of the spreadsheet system 110 via the computer network 160 or another network. In implementations, data in the external data sources 150-1, . . . , 150-m may be used as inputs to programs that are automatically synthesized by the program synthesizer 120.

FIG. 2 is a flowchart illustrating an example method 200 of automatically synthesizing programs that include one or more functions in a spreadsheet programming language, in accordance with implementations disclosed herein. For convenience, the operations of the flowchart are described with reference to a system that performs the operations. This system may include various components of various computer systems, such as one or more components of the spreadsheet system 110. Moreover, while operations of method 200 are shown in a particular order, this is not meant to be limiting. One or more operations may be reordered, omitted, or added.

At block 205, the system may receive first user input in a first cell in a spreadsheet. In implementations, at block 205, the program synthesizer 120 of the spreadsheet system 110 may receive first user input in a first cell in a spreadsheet. In an example, the program synthesizer 120 of the spreadsheet system 110 may receive a last name (e.g., "LastNameOne") as the first user input in response to a user providing the last name as the input in the first cell (e.g., B2) in the spreadsheet via a spreadsheet application user interface displayed on one of the clients 130-1, . . . , 130-n.

Still referring to FIG. 2, at block 210, the system may automatically synthesize a program using the first user input in the first cell as a first example. In implementations, at block 210, the program synthesizer 120 of the spreadsheet system 110 may automatically synthesize a program using the first user input in the first cell received at block 205 as a first example. In implementations, the program synthesizer 120 may use dynamic programming-based search algorithms to automatically synthesize the program. In implementations, the program that is automatically synthesized by the program synthesizer 120 includes one or more functions in a spreadsheet programming language and, when the program is executed, the program generates output that matches the first example.

Still referring to block 210, in implementations, the program that is automatically synthesized may when executed use, as program input data, data stored in one or more data source cells in the spreadsheet and/or data from one or more of the external data sources 150-1, . . . , 150-m. For example, while automatically synthesizing the program, the program synthesizer 120 may obtain program input data from one or more of the external data sources 150-1, . . . , 150-m and then use the program input data as input to the program (e.g., as input to one or more functions in a spreadsheet programming language used in the program). In implementations, the external data sources 150-1, . . . , 150-m may include enterprise knowledge bases, databases, other spreadsheets, and/or any other data sources. In implementations, the external data sources 150-1, . . . , 150-m may be included in an external data source mapping that is associated with the spreadsheet and that includes references (e.g., paths, uniform resource locators, links, etc.) to the external data sources 150-1, . . . , 150-m. In implementations, the program synthesizer 120 may use sampling-based search techniques to handle very large tables and knowledge bases.

Continuing with the previous example, at block 210, the program synthesizer 120 of the spreadsheet system 110 may automatically synthesize the program that generates output that matches the last name received as the first user input ("LastNameOne") at block 205. The program may use, as program input data, data stored in another cell in the spreadsheet, e.g., data stored in a cell (e.g., cell A2) that is in a column (e.g., column A) that stores full names, in the same row as the first cell corresponding to the first user input. In the example, the program input data, "FirstNameOne LastNameOne", may be stored in cell A2.

In the example, the program that is synthesized by the program synthesizer 120 at block 210 may be a program that uses a "LEN" function in a spreadsheet programming language that returns a length of a string, a "FIND" function in the spreadsheet programming language that returns a position at which a string is first found within text, and a "RIGHT" function in the spreadsheet programming language that returns a substring from the end of a specified string. For example, the program that is automatically synthesized at block 210 may be RIGHT(A2, LEN(A2)-FIND(" ", A2)), which may be genericized to RIGHT(A[current row], LEN(A[current row])-FIND(" ", [current row])). When the program is executed, using "FirstNameOne LastNameOne" as the program input data, "LastNameOne" is returned as the output, and therefore the program generates output that matches the first example.

Still referring to block 210, in other implementations, the program synthesizer 120 of the spreadsheet system 110 may automatically synthesize a program according to method 300 of FIG. 3, described below.

Still referring to FIG. 2, at block 215, the system may determine additional cell(s) in the spreadsheet that are related to the first cell. In implementations, at block 220, the program synthesizer 120 of the spreadsheet system 110 may determine one or more additional cells in the spreadsheet that are related to the first cell from which the first user input is received at block 205.

Still referring to block 215, in implementations, the program synthesizer 120 may determine the one or more additional cells based on the cells being included in the same column of a particular table in the spreadsheet as the first cell. In other implementations, the program synthesizer 120 may determine the one or more additional cells based on the cells being included in the same row of a particular table in the spreadsheet as the first cell. In other implementations, the program synthesizer 120 may use any other criteria (e.g., headings or labels for columns or rows in the spreadsheet, existing data, etc.) to determine the one or more additional cells that are related to the first cell.

Still referring to FIG. 2, at block 220, the system may determine whether or not a display triggering condition is satisfied. In implementations, at block 220, the program synthesizer 120 of the spreadsheet system 110 may determine whether or not a display triggering condition is satisfied.

Still referring to block 220, in implementations, the program synthesizer 120 can determine that the display triggering condition is satisfied based on determining that a level of complexity of the program that is automatically synthesized at block 210 satisfies a complexity threshold. In other implementations, the program synthesizer 120 may determine a confidence score associated with the program that is automatically synthesized at block 210, and the program synthesizer 120 can determine that the display triggering condition is satisfied based on determining that the confidence score associated with the program that is automatically synthesized at block 210 exceeds a predetermined confidence threshold. In other implementations, the display triggering condition may be based on a level of complexity of input strings (e.g., program input data) and/or a level of complexity of output (e.g., if the input strings and/or output are overly complex, the display triggering condition may not be satisfied).

Still referring to block 220, if the program synthesizer 120 of the spreadsheet system 110 determines that the display triggering condition is satisfied, then the flow proceeds to block 240. On the other hand, if the program synthesizer 120 of the spreadsheet system 110 determines that the display triggering condition is not satisfied, then the flow proceeds to block 225.

Still referring to FIG. 2, at block 225, the system may determine whether or not an availability alert triggering condition is satisfied. In implementations, at block 225, the program synthesizer 120 of the spreadsheet system 110 may determine whether or not an availability alert triggering condition is satisfied.

Still referring to block 225, in implementations, the program synthesizer 120 of the spreadsheet system 110 determining whether or not an availability alert triggering condition is satisfied can be based on a confidence score that is determined as described above with respect to block 220. In implementations, if the program synthesizer 120 determines at block 220 that the confidence score does not exceed the predetermined confidence threshold but determines at block 225 that the confidence score exceeds a minimum confidence threshold that is lower than the predetermined confidence threshold, then the program synthesizer 120 can determine that the availability alert triggering condition is satisfied.

Still referring to block 225, if the program synthesizer 120 of the spreadsheet system 110 determines that the availability alert triggering condition is satisfied, then the flow proceeds to block 230. On the other hand, if the program synthesizer 120 of the spreadsheet system 110 determines that the availability alert triggering condition is not satisfied, then the flow ends.

Still referring to FIG. 2, at block 230, the system may display in a user interface associated with the spreadsheet an indication of availability of the program that is automatically synthesized. In implementations, at block 230, the program synthesizer 120 of the spreadsheet system 110 may display in a spreadsheet application user interface displayed on one of the clients 130-1, . . . , 130-n associated with the spreadsheet an indication of availability of the program that is automatically synthesized at block 210. In implementations, the indication of availability of the program that is automatically synthesized may be an icon, a graphic, an animation, a prompt, a dialog, a tool tip, a button, or any other visual indicator that can be displayed in the spreadsheet application user interface on one of the clients 130-1, . . . , 130-n.

Still referring to FIG. 2, at block 235, the system may determine whether or not a request to display the automatically synthesized program is received. In implementations, at block 235, the program synthesizer 120 of the spreadsheet system 110 may determine whether or not a request to display the automatically synthesized program is received.

Still referring to block 235, in implementations, if a user selects a button or inputs a keyboard shortcut in response to the displaying the indication of availability of the program at block 230, the program synthesizer 120 may determine that the request to display the automatically synthesized program is received at block 235, and then the flow proceeds to block 240. On the other hand, if a user does not select a button or input a keyboard shortcut in response to the displaying the indication of availability of the program at block 230, the program synthesizer 120 may determine that the request to display the automatically synthesized program is not received at block 235, and then the flow ends.

Still referring to FIG. 2, at block 240, the system may display, in the additional cell(s), an output of the program corresponding to the additional cell(s). In implementations, at block 240, the program synthesizer 120 of the spreadsheet system 110 may cause the spreadsheet application user interface on one of the clients 130-1, . . . , 130-n to display, in each of the one or more additional cells determined at block 215, an output of the program that is automatically synthesized at block 210 corresponding to the additional cell.

Continuing with the previous example, the program synthesizer 120 may determine that cells B4 and B5 are the additional cells at block 215. Cell A4 may store the program input data "F3 L3", and cell A5 may store the program input data "FourF FourL". In the example, at block 240, the program synthesizer 120 of the spreadsheet system 110 may execute the program that is automatically synthesized at block 210, RIGHT(A[current row], LEN(A[current row])-FIND(" ", [current row])), to obtain the output "L3" corresponding to the additional cell B4 (using cell A4 as the program input data) and the output "FourL" corresponding to the additional cell B5 (using cell A5 as the program input data).

Still referring to block 240, in implementations, the program synthesizer 120 may cause the output of the program to be displayed in the one or more additional cells using a font, a style, or a color that is different from the font, the style, or the color used to display the first user input in the first cell. In other implementations, the program synthesizer 120 may cause a first font appearance including a font, a style, and a color to be used to display the user input in the first cell (e.g., in the spreadsheet application user interface on one of the clients 130-1, . . . , 130-n), and the program synthesizer 120 may cause the output of the program to be displayed in the one or more additional cells using a second font appearance that is different from the first font appearance (e.g., in the spreadsheet application user interface on one of the clients 130-1, . . . , 130-n).

Still referring to FIG. 2, at block 245, the system may display a prompt in a user interface associated with the spreadsheet that requests that a user accept or reject the program. In implementations, at block 245, the program synthesizer 120 of the spreadsheet system 110 may cause the spreadsheet application user interface on one of the clients 130-1, . . . , 130-n to display a prompt that requests that a user accept or reject the program that is automatically synthesized at block 210.

Still referring to block 245, in implementations, the prompt may be any visual indicator that requests that a user accept or reject the program that is automatically synthesized at block 210. The prompt may include one or more of an icon, a graphic, an animation, a tool tip, a button, or any other visual indicator that can be displayed in the spreadsheet application user interface on one of the clients 130-1, . . . , 130-n. The prompt may optionally show the program that is automatically synthesized (e.g., RIGHT(A [current row], LEN(A[current row])-FIND(" ", [current row]))).

Still referring to FIG. 2, at block 250, the system may determine whether or not an acceptance of the program is received from the user. In implementations, at block 250, the program synthesizer 120 of the spreadsheet system 110 may determine whether or not an acceptance of the program that is automatically synthesized at block 210 is received from the user in response to a selection of a user interface element that is included in the prompt that is displayed at block 245

(e.g., via the spreadsheet application user interface on one of the clients 130-1, . . . , 130-n) or in response to an input of a keyboard shortcut (e.g., via one of the clients 130-1, . . . , 130-n).

Still referring to block 250, in implementations, if a user selects a particular button (e.g., an "okay" or "accept" button included in the prompt) or inputs a first keyboard shortcut in response to the displaying the prompt at block 245, the program synthesizer 120 may determine that the acceptance of the program is received from the user at block 250, and then the flow proceeds to block 265. On the other hand, if a user selects another button (e.g., a "cancel" or "reject" button included in the prompt) or inputs a second keyboard shortcut in response to the displaying the prompt at block 245, the program synthesizer 120 may determine that the acceptance of the program is not received from the user at block 250 (i.e., the program synthesizer 120 may determine that a rejection of the program is received from the user at block 250), and then the flow proceeds to block 255.

Still referring to FIG. 2, at block 255, the system may maintain the first user input in the first cell and stop the displaying, in the additional cell(s), the output of the program corresponding to the additional cell(s). In implementations, at block 255, in response to receiving the rejection of the automatically synthesized program from the user at block 250, the program synthesizer 120 of the spreadsheet system 110 may maintain the first user input (received at block 205) in the first cell and stop the displaying (initiated at block 240), in the one or more additional cells (determined at block 215), the output of the program corresponding to the additional cells.

Still referring to FIG. 2, at block 260, the system may modify the display triggering condition in response to receiving the rejection of the program from the user. In implementations, at block 260, the program synthesizer 120 of the spreadsheet system 110 may modify the display triggering condition (e.g., using machine learning techniques) in response to receiving the rejection of the automatically synthesized program from the user at block 250.

Still referring to FIG. 2, at block 265, the system may replace the first user input by storing the program in association with the first cell, and store the program in association with the additional cell(s). In implementations, at block 265, in response to receiving the acceptance of the automatically synthesized program from the user at block 250, the program synthesizer 120 of the spreadsheet system 110 may replace the first user input (received at block 205) by storing the program that is automatically synthesized at block 210 in association with the first cell, and store the automatically synthesized program in association with the one or more additional cells (determined at block 215). Additionally, in implementations, at block 265, the program synthesizer 120 may optionally modify the display triggering condition used at block 220 (e.g., using machine learning techniques) in response to receiving the acceptance of the program from the user.

Still referring to block 265, in implementations, while the program synthesizer 120 may replace the first user input in the first cell with the automatically synthesized program, the value displayed in the first cell (e.g., on the user interface displayed on the client 130-1, . . . , 130-n) may remain unchanged, as the output of the automatically synthesized program matches the first user input previously provided (e.g., by a user) in the first cell. Continuing with the previous example, the program synthesizer 120 may replace the first user input ("LastNameOne") in the first cell (i.e., B2, which is the cell associated with the first user input received at block 205) with the automatically synthesized program RIGHT(A[current row], LEN(A[current row])-FIND(" ", A[current row])). While the input "LastNameOne" provided in the first cell (i.e., B2) is replaced with the automatically synthesized program, RIGHT(A[current row], LEN(A[current row])-FIND (" ", A[current row])), in the example, this program may output "LastNameOne", and therefore the value displayed in the first cell may remain unchanged.

Still referring to block 265, in implementations, subsequent to receiving the acceptance of the program from the user at block 250, the program synthesizer 120 may cause the output of the program to be displayed in the one or more additional cells using the first font appearance (i.e., the same font, style, and color used to display the user input in the first cell, e.g., in the spreadsheet application user interface on one of the clients 130-1, . . . , 130-n).

Still referring to FIG. 2, at block 270, the system may receive a selection of a cell in the spreadsheet. In implementations, at block 270, the program synthesizer 120 of the spreadsheet system 110 may receive a selection (e.g., from a user via the spreadsheet application user interface on one of the clients 130-1, . . . , 130-n) of one of the cells (e.g., the first cell) in the spreadsheet, in association therewith the automatically synthesized program was stored at block 265.

Still referring to FIG. 2, at block 275, the system may display the program in a formula bar in a user interface associated with the spreadsheet. In implementations, at block 275, the program synthesizer 120 of the spreadsheet system 110 may display the automatically synthesized program stored in association with the cell selected at block 270 in a formula bar in the spreadsheet application user interface on one of the clients 130-1, . . . , 130-n.

Still referring to FIG. 2, at block 280, the system may receive, from a user, an edit to the program that is displayed in the formula bar. In implementations, at block 280, the program synthesizer 120 of the spreadsheet system 110 may receive, from a user (e.g., via the spreadsheet application user interface on one of the clients 130-1, . . . , 130-n), an edit to the automatically synthesized program that is displayed in the formula bar at block 275.

Still referring to FIG. 2, at block 285, the system may store the edit to the program in association with the selected cell. In implementations, at block 285, the program synthesizer 120 of the spreadsheet system 110 may store the edit to the automatically synthesized program received at block 280 in association with the cell selected at block 270 (e.g., the first cell).

Figure 3:
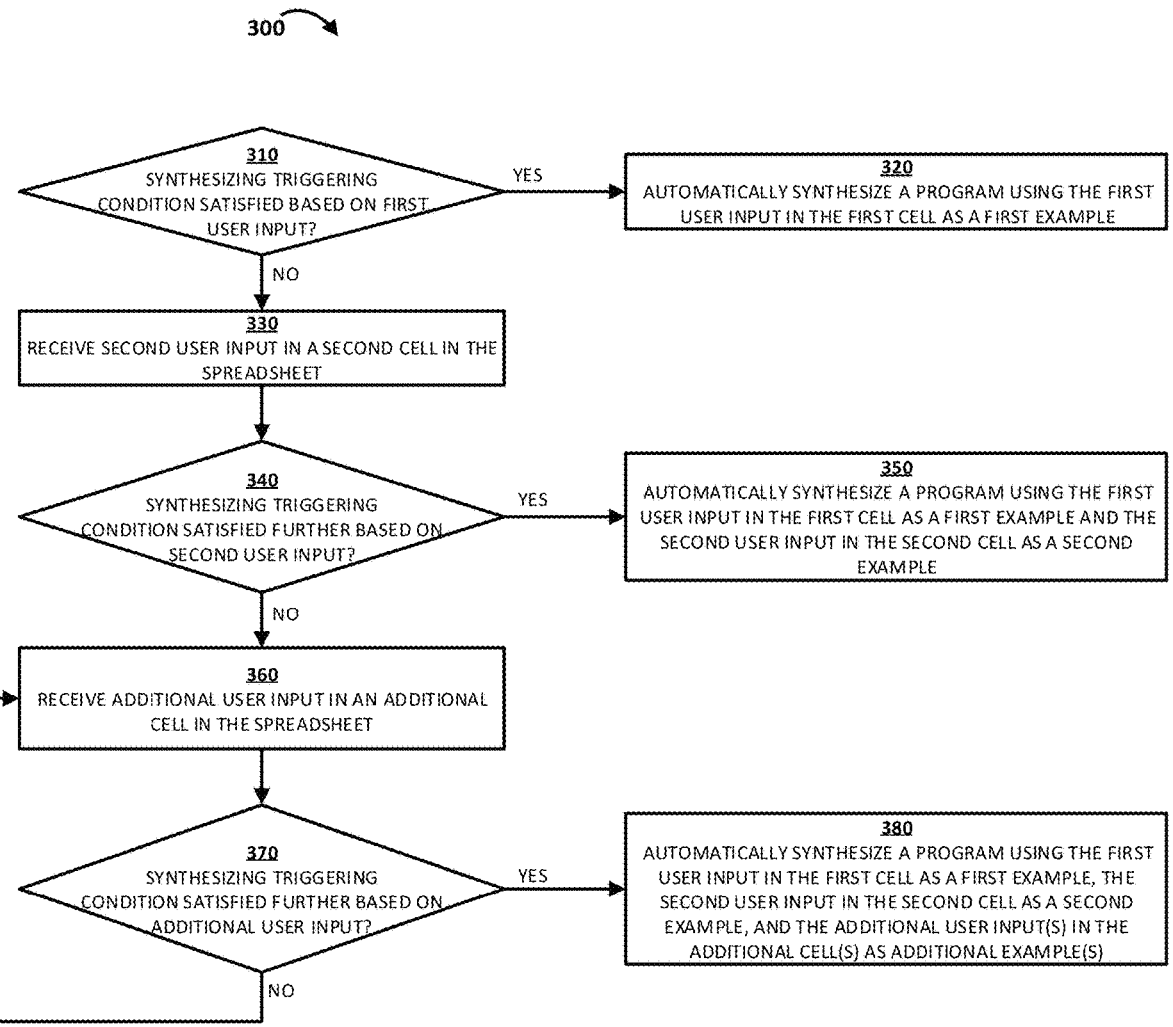
FIG. 3 depicts another flowchart illustrating an example method for practicing selected aspects of the present disclosure.

FIG. 3 is a flowchart illustrating an example method 300 of automatically synthesizing programs that include one or more functions in a spreadsheet programming language, in accordance with implementations disclosed herein. For convenience, the operations of the flowchart are described with reference to a system that performs the operations. This system may include various components of various computer systems, such as one or more components of the spreadsheet system 110. Moreover, while operations of method 300 are shown in a particular order, this is not meant to be limiting. One or more operations may be reordered, omitted, or added.

At block 310, the system may determine whether or not a synthesizing triggering condition is satisfied based on receiving the first user input in the first cell. In implementations, at block 310, the program synthesizer 120 of the spreadsheet system 110 may determine whether or not a synthesizing triggering condition is satisfied based on receiving the first user input in the first cell (e.g., as described above with respect to block 205 of FIG. 2). If the program synthesizer 120 of the spreadsheet system 110 determines that the synthesizing triggering condition is satisfied based on receiving the first user input in the first cell, then the flow proceeds to block 320. On the other hand, if the program synthesizer 120 of the spreadsheet system 110 determines that the synthesizing triggering condition is not satisfied based on receiving the first user input in the first cell, then the flow proceeds to block 330.

Still referring to FIG. 3, at block 320, the system may automatically synthesize a program using the first user input in the first cell as a first example. In implementations, at block 320, the program synthesizer 120 of the spreadsheet system 110 may automatically synthesize a program using the first user input in the first cell received at block 205 as a first example. In implementations, the program synthesizer 120 may use dynamic programming-based search algorithms to automatically synthesize the program. In implementations, the program that is automatically synthesized by the program synthesizer 120 includes one or more functions in a spreadsheet programming language and, when the program is executed, the program generates output that matches the first example.

Still referring to FIG. 3, at block 330, the system may receive second user input in a second cell in the spreadsheet. In implementations, at block 330, the program synthesizer 120 of the spreadsheet system 110 may receive second user input in a second cell in a spreadsheet. In an example, the program synthesizer 120 of the spreadsheet system 110 may receive a last name (e.g., "LNTwo") as the second user input in response to a user providing the last name as the input in the second cell (e.g., B3) in the spreadsheet via a spreadsheet application user interface displayed on one of the clients 130-1, . . . , 130-n.

Still referring to FIG. 3, at block 340, the system may determine whether or not a synthesizing triggering condition is satisfied further based on receiving the second user input in the second cell. In implementations, at block 340, the program synthesizer 120 of the spreadsheet system 110 may determine whether or not a synthesizing triggering condition is satisfied further based on receiving the second user input in the second cell at block 330. If the program synthesizer 120 of the spreadsheet system 110 determines that the synthesizing triggering condition is satisfied further based on receiving the second user input in the second cell, then the flow proceeds to block 350. On the other hand, if the program synthesizer 120 of the spreadsheet system 110 determines that the synthesizing triggering condition is not satisfied further based on receiving the second user input in the second cell, then the flow proceeds to block 360.

Still referring to FIG. 3, at block 350, the system may automatically synthesize a program using the first user input in the first cell as a first example and the second user input in the second cell as a second example. In implementations, at block 350, the program synthesizer 120 of the spreadsheet system 110 may automatically synthesize a program using the first user input in the first cell received at block 205 as a first example and the second user input in the second cell received at block 330 as a second example. In implementations, the program synthesizer 120 may use dynamic programming-based search algorithms to automatically synthesize the program. In implementations, the program that is automatically synthesized by the program synthesizer 120 includes one or more functions in a spreadsheet programming language and, when the program is executed, the program generates output that matches the first example and output that matches that second example.

Still referring to FIG. 3, at block 360, the system may receive additional user input in an additional cell in the spreadsheet. In implementations, at block 360, the program synthesizer 120 of the spreadsheet system 110 may receive additional user input in an additional cell in a spreadsheet, e.g., via a spreadsheet application user interface displayed on one of the clients 130-1, . . . , 130-n.

Still referring to FIG. 3, at block 370, the system may determine whether or not a synthesizing triggering condition is satisfied further based on receiving the additional user input in the additional cell. In implementations, at block 370, the program synthesizer 120 of the spreadsheet system 110 may determine whether or not a synthesizing triggering condition is satisfied further based on receiving the additional user input in the additional cell at block 360. If the program synthesizer 120 of the spreadsheet system 110 determines that the synthesizing triggering condition is satisfied further based on receiving the additional user input in the additional cell, then the flow proceeds to block 380. On the other hand, if the program synthesizer 120 of the spreadsheet system 110 determines that the synthesizing triggering condition is not satisfied further based on receiving the additional user input in the additional cell, then the flow returns to block 360.

Still referring to FIG. 3, at block 380, the system may automatically synthesize a program using the first user input in the first cell as a first example, the second user input in the second cell as a second example, and the additional user input(s) in the additional cell(s) as additional example(s). In implementations, at block 380, the program synthesizer 120 of the spreadsheet system 110 may automatically synthesize a program using the first user input in the first cell received at block 205 as a first example, the second user input in the second cell received at block 330 as a second example, and the additional user input(s) in the additional cell(s) received at block 360 as additional example(s). In implementations, the program synthesizer 120 may use dynamic programming-based search algorithms to automatically synthesize the program. In implementations, the program that is automatically synthesized by the program synthesizer 120 includes one or more functions in a spreadsheet programming language and, when the program is executed, the program generates output that matches the first example, output that matches that second example, and output(s) that match the additional example(s).

FIG. 4 is a flowchart illustrating an example method 400 of automatically synthesizing programs that include one or more functions in a spreadsheet programming language, in accordance with implementations disclosed herein. For convenience, the operations of the flowchart are described with reference to a system that performs the operations. This system may include various components of various computer systems, such as one or more components of the spreadsheet system 110. Moreover, while operations of method 400 are shown in a particular order, this is not meant to be limiting. One or more operations may be reordered, omitted, or added.

At block 410, the system may receive first user input in a first cell in a spreadsheet. In implementations, at block 410, the program synthesizer 120 of the spreadsheet system 110 may receive first user input in a first cell in a spreadsheet. In implementations, the first user input may include at least one function in a spreadsheet programming language. In an example, the program synthesizer 120 of the spreadsheet system 110 may receive a formula or program that includes one or more functions in a spreadsheet programming language, e.g., RIGHT(A2, LEN(A2)-FIND(" ", A2)), as the first user input, in response to a user providing the formula or program as the input in the first cell (e.g., B2) in the spreadsheet via a spreadsheet application user interface displayed on one of the clients 130-1, . . . , 130-n.

Still referring to FIG. 4, at block 420, the system may determine whether or not a display triggering condition is satisfied based on receiving the first user input in the first cell. In implementations, at block 420, the program synthesizer 120 of the spreadsheet system 110 may determine whether or not a display triggering condition is satisfied based on receiving the first user input in the first cell at block 410. In implementations, if the program synthesizer 120 of the spreadsheet system 110 determines that the display triggering condition is satisfied based on receiving the first user input in the first cell, then the flow proceeds to block 430. On the other hand, if the program synthesizer 120 of the spreadsheet system 110 determines that the display triggering condition is not satisfied based on receiving the first user input in the first cell, then the flow ends.

Still referring to block 420, in implementations, the display triggering condition may be a threshold amount of time spent (e.g., by a user) providing the first user input. In other implementations, the display triggering condition may be a level of complexity of the first user input that exceeds a level of complexity of the automatically synthesized program.

Still referring to FIG. 4, at block 430, the system may display a prompt in a user interface associated with the spreadsheet that provides an option to automatically synthesize a program in the spreadsheet programming language based on an example. In implementations, at block 430, in response to the determining that the display triggering condition is satisfied at block 420, the program synthesizer 120 of the spreadsheet system 110 may display a prompt in a user interface associated with the spreadsheet that provides an option to automatically synthesize a program in the spreadsheet programming language based on an example, where the program, when executed, generates output that matches the example.

Still referring to block 430, in implementations, the prompt may be any visual indicator that requests that a user accept or reject the option to automatically synthesize a program in the spreadsheet programming language based on an example. The prompt may include one or more of an icon, a graphic, an animation, a tool tip, a button, or any other visual indicator that can be displayed in the spreadsheet application user interface on one of the clients 130-1, . . . , 130-n.

Still referring to FIG. 4, at block 440, the system may determine whether or not an acceptance of the option to automatically synthesize a program is received from the user. In implementations, at block 440, the program synthesizer 120 of the spreadsheet system 110 may determine whether or not an acceptance of the option to automatically synthesize a program is received from the user in response to a selection of a user interface element that is included in the prompt (e.g., via the spreadsheet application user interface on one of the clients 130-1, . . . , 130-n) or in response to an input of a keyboard shortcut (e.g., via one of the clients 130-1, . . . , 130-n).

Still referring to block 440, in implementations, if a user selects a particular button (e.g., an "okay" or "accept" button included in the prompt) or inputs a first keyboard shortcut in response to the displaying the prompt at block 430, the program synthesizer 120 may determine that the acceptance of the option to automatically synthesize a program is received from the user at block 440, and then the flow proceeds to block 450. On the other hand, if a user selects another button (e.g., a "cancel" or "reject" button included in the prompt) or inputs a second keyboard shortcut in response to the displaying the prompt at block 430, the program synthesizer 120 may determine that the acceptance of the option to automatically synthesize a program is not received from the user at block 440 (i.e., the program synthesizer 120 may determine that a rejection of the option to automatically synthesize a program is received from the user at block 440), and then the flow ends.

Still referring to FIG. 4, at block 450, the system may automatically synthesize the program in the spreadsheet programming language. In implementations, at block 450, the program synthesizer 120 of the spreadsheet system 110 may automatically synthesize the program in the spreadsheet programming language, e.g., as described with respect to block 210 of FIG. 2, using, as an example, a result value in the first cell in the spreadsheet generated based on the first user input received at block 410 (e.g., by evaluating the formula or executing the program). In implementations, the program that is automatically synthesized by the program synthesizer 120 includes one or more functions in a spreadsheet programming language and, when the program is executed, the program generates output that matches the example.

Still referring to block 450, in an example, if the program RIGHT(A2, LEN(A2)-FIND(" ", A2)) is received at block 410 as the first user input, when the program is executed, using "FirstNameOne LastNameOne" as the program input data, "LastNameOne" is returned as the output. The program synthesizer 120 of the spreadsheet system 110 may automatically synthesize a program in the spreadsheet programming language using the result value "LastNameOne" as the example. In the example, the program that is automatically synthesized by the program synthesizer 120, when executed, generates output that matches "LastNameOne".

Still referring to FIG. 4, at block 460, the system may replace the first user input by storing the program in association with the first cell. In implementations, at block 460, in response to the receiving the acceptance of the option to automatically synthesize a program at block 440, and optionally further in response to receiving an acceptance of the program that is automatically synthesized at block 450, the program synthesizer 120 of the spreadsheet system 110 may replace the first user input by storing the program that is automatically synthesized at block 450 in association with the first cell.

Figure 5:
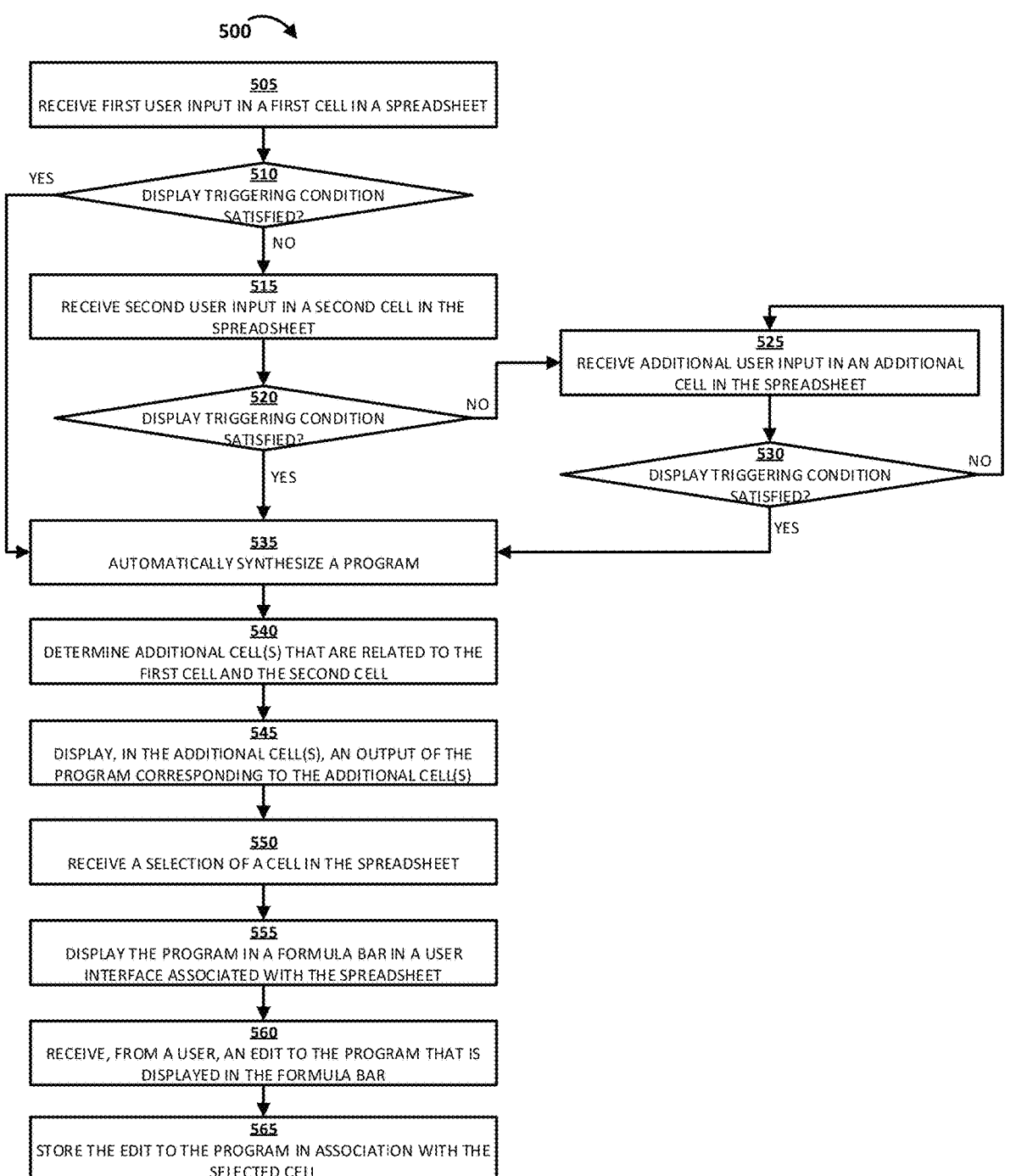
FIG. 5 depicts another flowchart illustrating an example method for practicing selected aspects of the present disclosure.

FIG. 5 is a flowchart illustrating an example method 500 of automatically synthesizing programs that include one or more functions in a spreadsheet programming language, in accordance with implementations disclosed herein. For convenience, the operations of the flowchart are described with reference to a system that performs the operations. This system may include various components of various computer systems, such as one or more components of the spreadsheet system 110. Moreover, while operations of method 500 are shown in a particular order, this is not meant to be limiting. One or more operations may be reordered, omitted, or added.

At block 505, the system may receive first user input in a first cell in a spreadsheet. In implementations, at block 505, the program synthesizer 120 of the spreadsheet system 110 may receive first user input in a first cell in a spreadsheet.

Still referring to FIG. 5, at block 510, the system may determine whether or not a display triggering condition is satisfied. In implementations, at block 510, in response to receiving the first user input in the first cell at block 505, the program synthesizer 120 of the spreadsheet system 110 may determine whether or not a display triggering condition is satisfied. In implementations, the display triggering condition may be based on user feedback and previous user interactions with the spreadsheet. If the program synthesizer 120 of the spreadsheet system 110 determines that the display triggering condition is satisfied, then the flow proceeds to block 535. On the other hand, if the program synthesizer 120 of the spreadsheet system 110 determines that the display triggering condition is not satisfied, then the flow proceeds to block 515.

Still referring to FIG. 5, at block 515, the system may receive second user input in a second cell in the spreadsheet. In implementations, at block 515, the program synthesizer 120 of the spreadsheet system 110 may receive second user input in a second cell in the spreadsheet.

Still referring to FIG. 5, at block 520, the system may determine whether or not a display triggering condition is satisfied. In implementations, at block 520, in response to receiving the second user input in the second cell at block 515, the program synthesizer 120 of the spreadsheet system 110 may determine whether or not a display triggering condition is satisfied. If the program synthesizer 120 of the spreadsheet system 110 determines that the display triggering condition is satisfied, then the flow proceeds to block 535. On the other hand, if the program synthesizer 120 of the spreadsheet system 110 determines that the display triggering condition is not satisfied, then the flow proceeds to block 525.

Still referring to FIG. 5, at block 525, the system may receive additional user input in an additional cell in the spreadsheet. In implementations, at block 525, the program synthesizer 120 of the spreadsheet system 110 may receive additional user input in an additional cell in the spreadsheet.

Still referring to FIG. 5, at block 530, the system may determine whether or not a display triggering condition is satisfied. In implementations, at block 530, in response to receiving the additional user input in the additional cell at block 525, the program synthesizer 120 of the spreadsheet system 110 may determine whether or not a display triggering condition is satisfied. If the program synthesizer 120 of the spreadsheet system 110 determines that the display triggering condition is satisfied, then the flow proceeds to block 535. On the other hand, if the program synthesizer 120 of the spreadsheet system 110 determines that the display triggering condition is not satisfied, then the flow returns to block 525.

Still referring to FIG. 5, at block 535, the system may automatically synthesize a program. In implementations, at block 535, the program synthesizer 120 of the spreadsheet system 110 may automatically synthesize a program using the first user input in the first cell received at block 505 as a first example, and optionally using the second user input in the second cell as a second example (i.e., if the second user input is received at block 515) and the additional user input as an additional example (i.e., if the additional user input is received at block 525). In implementations, the program that is automatically synthesized by the program synthesizer 120 includes one or more functions in a spreadsheet programming language and, when the program is executed, the program generates first output that matches the first example and optionally second output that matches the second example (i.e., if the second user input is received at block 515) and additional output that matches the additional example (i.e., if the additional user input is received at block 525).

Still referring to FIG. 5, at block 540, the system may determine additional cell(s) that are related to the first cell and the second cell. In implementations, at block 540, the program synthesizer 120 of the spreadsheet system 110 may determine one or more additional cells that are related to the first cell and the second cell (if the second user input is received at block 515).

Still referring to FIG. 5, at block 545, the system may display, in the additional cell(s), an output of the program corresponding to the additional cell(s). In implementations, at block 545, in response to the determining that the display triggering condition is satisfied at block 520, the program synthesizer 120 of the spreadsheet system 110 may display, in the one or more additional cells, an output of the program corresponding to the one or more additional cells.

Still referring to FIG. 5, at block 550, the system may receive a selection of a cell in the spreadsheet. In implementations, at block 550, the program synthesizer 120 of the spreadsheet system 110 may receive a selection of a cell (e.g., the first cell) in the spreadsheet.

Still referring to FIG. 5, at block 555, the system may display the program in a formula bar in a user interface associated with the spreadsheet. In implementations, at block 555, the program synthesizer 120 of the spreadsheet system 110 may display the automatically synthesized program stored in association with the cell selected at block 550 (e.g., the first cell) in a formula bar in the spreadsheet application user interface on one of the clients 130-1, . . . , 130-n.

Still referring to FIG. 5, at block 560, the system may receive, from a user, an edit to the program that is displayed in the formula bar. In implementations, at block 560, the program synthesizer 120 of the spreadsheet system 110 may receive, from a user, an edit to the program that is displayed in the formula bar.

Still referring to FIG. 5, at block 565, the system may store the edit to the program in association with the selected cell. In implementations, at block 565, the program synthesizer 120 of the spreadsheet system 110 may store the edit to the program in association with the selected cell (e.g., the first cell).

Figure 6:
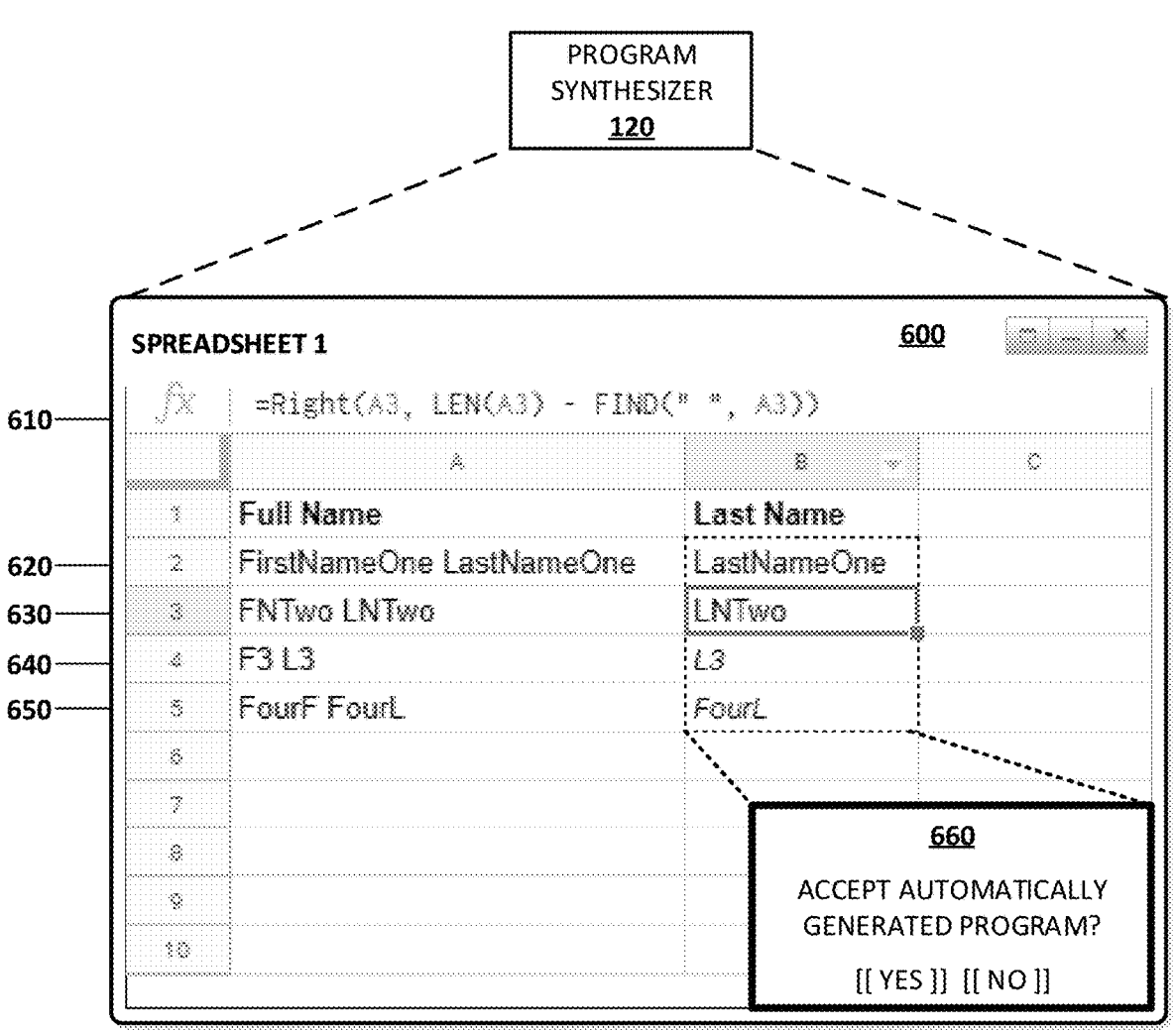
FIG. 6 depicts an example application of techniques described herein, in accordance with various implementations.

FIG. 6 depicts an example of how programs that include one or more functions in a spreadsheet programming language may be automatically synthesized. At bottom, a graphical user interface ("GUI") 600 is depicted that may be used by a spreadsheet application user to view, create, or edit a spreadsheet (e.g., "Spreadsheet 1"). In this example, Spreadsheet 1 includes a Full Name column (A) and a Last Name column (B). The Full Name column may include various full names.

In some implementations, in response to a user inputting data (e.g., a last name such as "LastNameOne") into the Last Name column (B) in the second row 620, the program synthesizer 120 of the spreadsheet system 110 may receive first user input in a first cell (B2) in the spreadsheet (e.g., as described with respect to block 205 of FIG. 2). Additionally, in some implementations, in response to the user inputting data (e.g., a last name such as "LNTwo") into the Last Name column (B) in the third row 630, the program synthesizer 120 of the spreadsheet system 110 may receive second user input in a second cell (B3) in the spreadsheet (e.g., as described with respect to block 330 of FIG. 3).

Still referring to FIG. 6, in some implementations, the program synthesizer 120 of the spreadsheet system 110 may automatically synthesize a program (e.g., as described with respect to block 210 of FIG. 2) and determine that additional cell B4 in the third row 640 in the spreadsheet and additional cell B5 in the fourth row 650 in the spreadsheet are related to the first cell (e.g., as described with respect to block 215 of FIG. 2). In some implementations, in response to determining that a display triggering condition is satisfied (e.g., as described with respect to block 220 of FIG. 2), the program synthesizer 120 of the spreadsheet system 110 may display, in the additional cell B4 in the third row 640 in the spreadsheet and in the additional cell B5 in the fourth row 650 in the spreadsheet, an output of the automatically synthesized program. In implementations, the program synthesizer 120 of the spreadsheet system 110 causes the output "L3" of the automatically synthesized program to be displayed in cell B4 in the third row 640 of the spreadsheet and the output "FourL" to be displayed in cell B5 in the fourth row 650 of the spreadsheet, in a font style (e.g., italics) that is different from the font style used (e.g., regular) used to display the first user input ("LastNameOne") in the cell B2 and the second user input ("LNTwo") in the cell B3.

Still referring to FIG. 6, in some implementations, the program synthesizer 120 of the spreadsheet system 110 may display a prompt 660 in the GUI 600 that requests that a user accept or reject the automatically synthesized program. In response to receiving an acceptance of the program from the user, e.g., by the user selecting the "YES" button in the prompt 660 that is displayed in the GUI 600, the program synthesizer 120 of the spreadsheet system 110 may store the automatically synthesized program in association with cells B2, B3, B4, and B5 in the spreadsheet (e.g., as described with respect to block 265 of FIG. 2). In implementations, in response to receiving a selection of a cell such as the cell B3 in the second row 630 of the spreadsheet, the automatically synthesized program (e.g., =Right(A3, LEN(A3)-FIND(" ", A3))) stored in association with the cell may be displayed in a formula bar 610 in the GUI 600.

The scenario of FIG. 6 is for illustrative purposes only. Programs may be automatically synthesized using techniques described herein for any number of applications.

Figure 7:
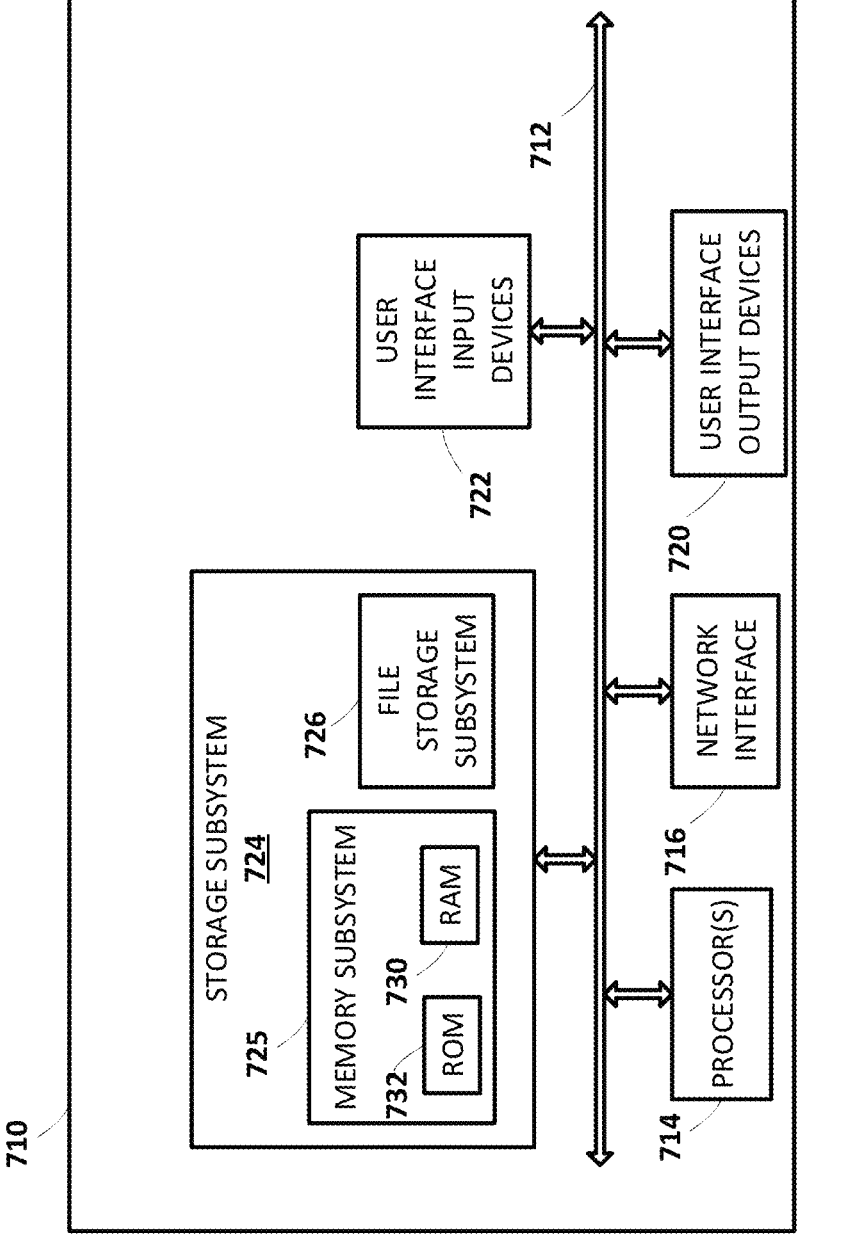
FIG. 7 illustrates an example architecture of a computing device.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods of FIGS. 2, 3, 4, and 5, as well as to implement various components depicted in FIG. 1.

These software modules are generally executed by processor 714 alone or in combination with other processors. The memory subsystem 725 included in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

Implementations may address problems with excessive data entry, client device usage, and duplication of the same data in multiple places in a spreadsheet by providing methods and systems for automatically synthesizing programs. In particular, some implementations may improve the functioning of a computer by providing methods and systems for automatically synthesizing a program that includes at least one function in a spreadsheet programming language and that, when executed, generates output matching one or more user-provided output examples. Accordingly, through the use of rules that improve computer-related technology, implementations allow computer performance of functions not previously performable by a computer. Additionally, implementations use techniques that are, by definition, rooted in computer technology (e.g., a spreadsheet programming language, a spreadsheet user interface, machine learning techniques, etc.).

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   receiving first user input in a first cell in a spreadsheet;
   automatically synthesizing a program using the first user input in the first cell as a first example, wherein:
      executing the program, that is automatically synthesized, uses fewer processing resources or memory resources than executing the first user input,
      the program comprises at least one function in a spreadsheet programming language that is implemented by a spreadsheet application,
      one or more of the at least one function in the spreadsheet programming language operate on data in another cell in the spreadsheet, and
      when the program is stored in association with the first cell and executed by the spreadsheet application, the program generates output that matches the first example;
   determining at least one additional cell in the spreadsheet that is related to the first cell;
   determining, based on functions in the spreadsheet programming language that are in the program that is automatically synthesized, a level of complexity of the program that is automatically synthesized;
   determining an additional level of complexity of the first user input;
   determining that a display triggering condition is satisfied, based on the level of complexity of the program that is automatically synthesized not exceeding the additional level of complexity of the first user input;
   in response to the determining that the display triggering condition is satisfied, displaying, in each of the at least one additional cell, an output of the program corresponding to the additional cell; and
   displaying the program in a formula bar in a user interface associated with the spreadsheet.

2. The method according to claim 1, further comprising determining a confidence score associated with the program that is automatically synthesized,
   wherein the determining that the display triggering condition is satisfied is further based on determining that the confidence score associated with the program that is automatically synthesized exceeds a predetermined confidence threshold.

3. The method according to claim 2, further comprising, in response to the confidence score associated with the program that is automatically synthesized exceeding a minimum confidence threshold but not exceeding the predetermined confidence threshold, displaying in the user interface associated with the spreadsheet an indication of availability of the program that is automatically synthesized.

4. The method according to claim 1, further comprising determining that a synthesizing triggering condition is satisfied, wherein the automatically synthesizing the program is performed in response to the determining that the synthesizing triggering condition is satisfied.

5. The method according to claim 4, wherein the determining that the synthesizing triggering condition is satisfied is based on the receiving the first user input in the first cell.

6. The method according to claim 5, further comprising receiving second user input in a second cell in the spreadsheet, wherein:

the determining that the synthesizing triggering condition is satisfied is further based on the receiving the second user input in the second cell;

the automatically synthesizing the program further comprises using the second user input in the second cell as a second example; and the program, when executed, further generates output that matches the second example.

7. The method according to claim 1, further comprising:

receiving, from a user, an edit to the program that is displayed in the formula bar; and storing the edit to the program in association with the first cell.

8. The method according to claim 1, wherein the output of the program is displayed in the at least one additional cell using a font, a style, or a color that is different from the font, the style, or the color used to display the first user input in the first cell.

9. The method according to claim 1, further comprising:

displaying a prompt in the user interface associated with the spreadsheet that requests that a user accept or reject the program;

in response to the displaying the prompt, receiving an acceptance of the program from the user; and in response to the receiving the acceptance of the program from the user, replacing the first user input by storing the program in association with the first cell, and storing the program in association with each of the at least one additional cell.

10. The method according to claim 9, wherein the acceptance of the program is received in response to a selection of a user interface element that is included in the prompt or in response to an input of a keyboard shortcut.

11. The method according to claim 9, wherein:

a first font appearance comprising a font, a style, and a color is used to display the user input in the first cell;

prior to the receiving the acceptance of the program from the user, the output of the program is displayed in the at least one additional cell using a second font appearance that is different from the first font appearance; and subsequent to the receiving the acceptance of the program from the user, the output of the program is displayed in the first font appearance.

12. The method according to claim 1, further comprising:

displaying a prompt in the user interface associated with the spreadsheet that requests that a user accept or reject the program;

in response to the displaying the prompt, receiving a rejection of the program from the user; and in response to the receiving the rejection of the program from the user, maintaining the first user input in the first cell and stopping the displaying, in each of the at least one additional cell, the output of the program corresponding to the additional cell.

13. The method according to claim 12, further comprising modifying the display triggering condition in response to receiving the rejection of the program from the user.

14. A computer program product comprising one or more non-transitory computer-readable storage media having program instructions collectively stored on the one or more non-transitory computer-readable storage media, the program instructions executable to:

receive first user input in a first cell in a spreadsheet, the first user input comprising at least one function in a spreadsheet programming language that is implemented by a spreadsheet application;

determine that a display triggering condition is satisfied based on (i) the receiving the first user input in the first cell, (ii) a level of complexity of the first user input in the first cell, the level of complexity being determined based on the at least one function in the spreadsheet programming language that is in the first user input, and (iii) a duration of time a user spent providing the first user input exceeding a threshold duration of time; and in response to the determining that the display triggering condition is satisfied, display a prompt in a user interface associated with the spreadsheet that provides an option to automatically synthesize a program in the spreadsheet programming language based on an example, wherein:

executing the program uses fewer processing resources or memory resources than executing the first user input, the program comprises one or more functions, in the spreadsheet programming language, that operate on data in another cell in the spreadsheet, the program, when stored in association with the first cell and executed by the spreadsheet application, generates output that matches the example, and the program, upon selection of the first cell, is displayed in a formula bar in the user interface associated with the spreadsheet.

15. The computer program product according to claim 14, wherein the display triggering condition is further based on the level of complexity of the first user input exceeding a level of complexity of the program.

16. The computer program product according to claim 14, the program instructions further being executable to:

in response to the displaying the prompt, receive an acceptance of the option to automatically synthesize the program;

automatically synthesize the program in the spreadsheet programming language, using a result value in the first cell in the spreadsheet generated based on the first user input as the example; and in response to the receiving the acceptance, replace the first user input by storing the program in association with the first cell, wherein the acceptance of the option to automatically synthesize the program is received in response to a selection of a user interface element that is included in the prompt or in response to an input of a keyboard shortcut.

17. A system comprising:

a processor, a computer-readable memory, one or more computer-readable storage media, and program instructions collectively stored on the one or more computer-readable storage media, the program instructions executable to:

receive first user input in a first cell in a spreadsheet;

in response to the receiving the first user input in the first cell, determine that a display triggering condition is not satisfied, based on previous user interactions with the spreadsheet;

receive second user input in a second cell in the spreadsheet;

in response to the receiving the second user input in the second cell, determine that the display triggering condition is satisfied, based on the previous user interactions with the spreadsheet;

automatically synthesize a program using the first user input in the first cell as a first example and the second user input in the second cell as a second example, wherein:

executing the program uses fewer processing resources or memory resources than executing the first user input and/or executing the second user input, the program comprises at least one function in a spreadsheet programming language that is implemented by a spreadsheet application, one or more of the at least one function in the spreadsheet programming language operate on data in another cell in the spreadsheet, the program, when stored in association with the first cell and executed by the spreadsheet application, generates first output that matches the first example and second output that matches the second example, and the program, upon selection of the first cell, is displayed in a formula bar in a user interface associated with the spreadsheet;

determine at least one additional cell that is related to the first cell and the second cell; and in response to the determining that the display triggering condition is satisfied, display, in each of the at least one additional cell, an output of the program corresponding to the additional cell.

18. The method according to claim 1, wherein the level of complexity of the program that is automatically synthesized is determined based on a number of the functions in the spreadsheet programming language that are in the program or based on a number of nested levels of the functions in the spreadsheet programming language that are in the program.

\* \* \* \* \*